July 26, 1960   E. H. SPAULDING   2,946,070
METHOD OF MAKING TURNED SLIPPERS
Original Filed Jan. 17, 1956   2 Sheets-Sheet 1
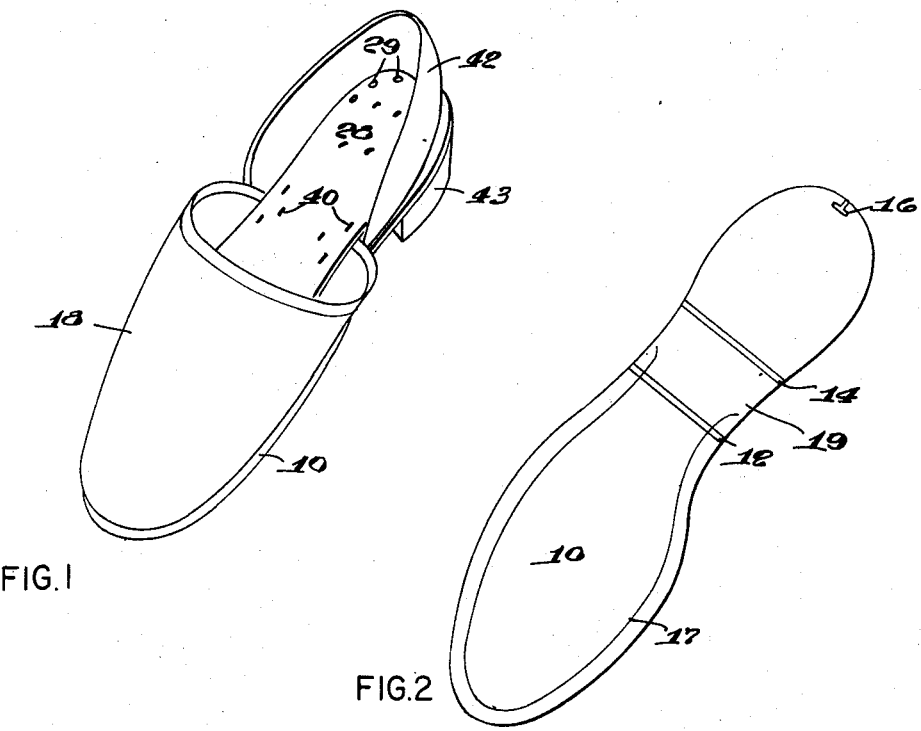
FIG.1
FIG.2
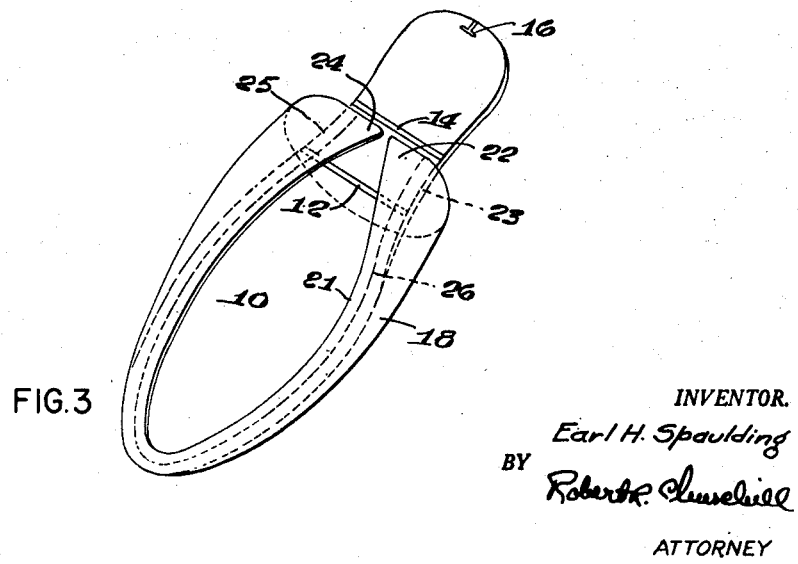
FIG.3
INVENTOR.
Earl H. Spaulding
BY Robert R. Churchill
ATTORNEY July 26, 1960     E. H. SPAULDING     2,946,070
METHOD OF MAKING TURNED SLIPPERS Original Filed Jan. 17, 1956     2 Sheets-Sheet 2

INVENTOR.
Earl H. Spaulding
BY Robert P. Churchill
ATTORNEY

United States Patent Office 2,946,070
Patented July 26, 1960

2,946,070

METHOD OF MAKING TURNED SLIPPERS

Earl H. Spaulding Wakefield, Mass., assignor to L. B. Evans' Son Company, Wakefield, Mass., a corporation of Massachusetts Original application Jan. 17, 1956, Ser. No. 559,677, now Patent No. 2,845,724, dated Aug. 5, 1958. Divided and this application Apr. 15, 1958, Ser. No. 728,583

4 Claims. (Cl. 12—142)

This invention relates to a method of making hand-turned house slippers.

The object of the invention is to provide a novel, efficient and economical method of making a hand-turned slipper by which a superior, more attractive, stonger and more durable slipper may be produced than by prior methods of which I am aware.

With this general object in view and such others as may hereinafter appear, the invention consists in the method of making a turned slipper as hereinafter described and particularly defined in the claims at the end of this specification.

In the drawings illustrating the present invention:

Fig. 1 is a perspective view of a slipper manufactured in accordance with the present invention;

Fig. 2 is a plan view of a sole marked in accordance with the first step preferably employed in the formation of the present slipper;

Fig. 3 is a perspective view illustrating the assembly of the lasted and stitched vamp and outsole prior to turning;

Figure 4:
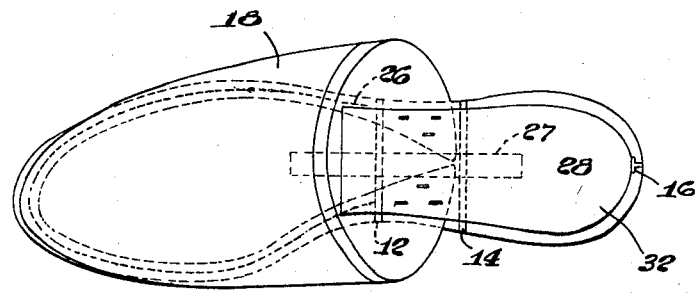
Fig. 4 is a plan view of the assembly shown in Fig. 3 after the vamp has been turned illustrating the structure resulting from cutting back the inseam stitches in accordance with the present method and with the shank secured to the wing portions of the vamp.

In general the present invention contemplates a novel and improved slipper of the type having a hand-turned vamp and a so-called "premold quarter" and in the novel and improved method of making the same in an efficient, economical manner. The invention consists in the slipper and in the method of making the same wherein the premolded quarter is assembled in operative position with relation to the vamp, sole and shank thereof in a novel manner. One of the principal features of the present invention is to provide a hand-turned slipper having a premold quarter in which substantially all of the desirable characteristics of a conventional hand-turned slipper are present and which may be economically and efficiently manufactured utilizing a minimum of skilled labor.

In general the present invention in its preferred form contemplates a novel construction of slipper in which a vamp 18 is secured by stitching 26 to the outsole 10 and wherein the rear portion of the vamp terminates in two wing portions 22, 24 of substantial area which extend inwardly from the marginal edges 23, 25 of the outsole 10, just forwardly of the heel breast line 14 of the slipper, and are free therefrom. In practice the stitching 26 may be cut back to effect freeing of the rear portion of the wings 22, 24 from the outsole 10. The forward portion of a "premolded quarter" 42 underlies the wings 22, 24, and such portion is also preferably free from the outsole 10. The slipper further embodies a shank piece 28, preferably of fiber board, and which may be provided with a suitable reinforcing plate 27 on the underside thereof. The shank piece extends forwardly within the slipper beyond said vamp wings 22, 24 and is provided with a heel portion 32 conforming to and extending into the quarter 42. The shank piece is mechanically fastened to the free portions of the wings and overlies portions of the stitching 26.

The heel portion of the shank piece is mechanically fastened to the outsole 10, preferably by fasteners 29, extending partially therethrough, thus leaving the mid part of the shank piece, the rear part of the wings and preferably the forward part of the quarter free from the outsole 10. During use of the slipper the weight of the wearer firmly compresses the wing portions, the shank piece and the forward portion of the quarter together, and in this manner a tight joint is maintained therebetween which is maintained during the entire life of the slipper.

In the preferred method of making the slipper the upper surface of the outsole is first provided with guide marks or guide lines 12, 14, 16 in order to facilitate the assembly of the slipper components as will be described.

The outsole 10 is also provided with a channel 17 in its upper surface spaced inwardly from and extending around the front part of the sole terminating at the shank 19 thereof. The first step in the formation of the present slipper consists in tacking the channeled and marked outsole upside down and upon a suitable last (not shown) and lasting a grain leather and preferably lined vamp 18 inside out over the last, tacking the same to the outsole 10 adjacent the inseam margins 21. In assembling the vamp and outsole for the lasting operation the ends of the rearwardly and inwardly extending wing portions 22, 24 of the vamp 18 are disposed as close as possible to the guide mark 14 as best shown in Fig. 3. The vamp 18 is then stitched along its margin 21 to the outsole 10, as shown, the stitching 26 extending fully to the ends of the wing portions 22, 24. In this manner the vamp 18 is securely fastened inside out to the outsole 10. The tacks are then removed, and the margin 21 of the vamp 18 except for the wing portions 22, 24 is trimmed to remove any excess leather therefrom. The last may then be removed. The slipper is then worked on the usual turning iron (not shown) until it is turned right side out in accordance with the usual practice in the manufacture of hand-turned slippers.

Figure 5:
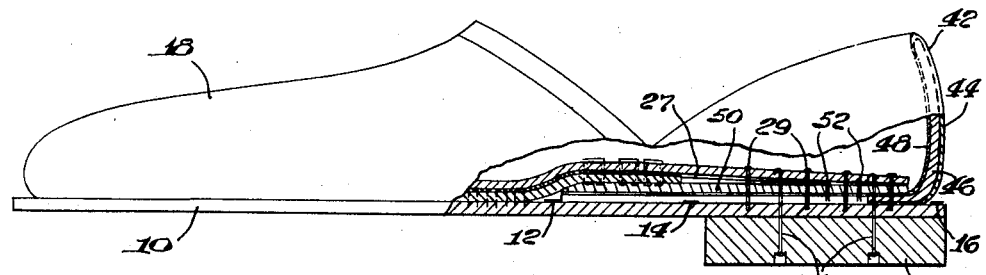
Fig. 5 is a side elevation partially broken away and partly in section illustrating the structure of the present slipper produced in accordance with the present invention.

The next step in the formation of the slipper consists in cutting the stitching 26 at the wing portions 22, 24 back to the guide mark 12, as illustrated in Fig. 4, to thereby free the rear of the wing portions 22, 24 of the vamp from the outsole 10 in order to permit a suitable shank 28 to be attached thereto. The shank 28 comprises a relatively stiff fibrous member of a width slightly less than and shaped to conform to the heel and shank portions of the outsole 10 and of a length such that it will extend from the guide mark 16 at the heel portion of the outsole, as shown, to a point a substantial distance forwardly of the guide mark 12. The shank 28 is provided in its bottom surface with a substantially rectangular elongated metal reinforcing plate 27, the plate being disposed substantially midway between its ends to additionally stiffen and strengthen the same. The heel end 32 of the shank 28 is placed in substantial alignment with the forward edge of the relatively thick guide mark 16, and the forward end of the shank 28 is inserted into the toe portion of the slipper such that it will substantially overlie the wing portions 22, 24 and the stitching of the vamp 18. The shank 28 is then mechanically secured to said wing portions 22, 24, as by staples 40, in the manner illustrated in Figs. 4 and 5.

From the description thus far it will be seen that the shank 28 provided with the metal reinforcing plate is adapted to form a bridge between the heel and toe portions of the slipper over the shank thereof. The shank 28 and the wing portions 22, 24 of the vamp 18 attached thereto may be readily lifted upwardly away from the outsole 10 to thereby expose the guide mark 12 to permit the forward end of the premolded quarter 42 to be inserted under the wing portions 22, 24 and shank 28 in a manner hereinafter to be more fully described.

Figure 6:
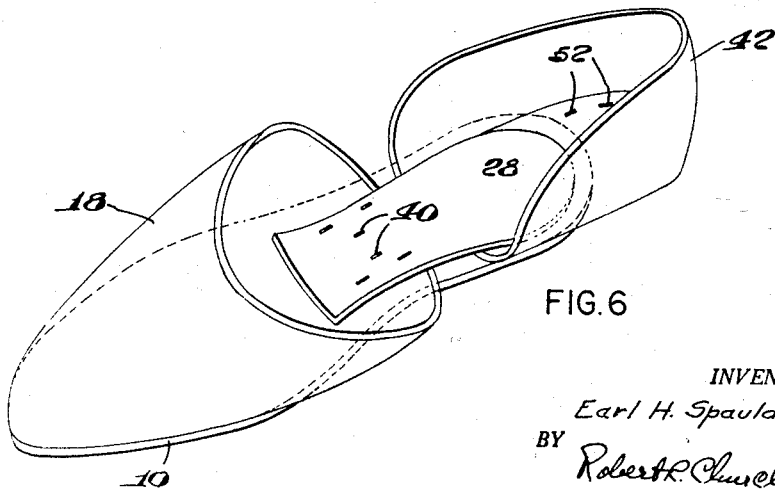
Fig. 6 is a perspective view illustrating the step of inserting the quarter into position under the shank and wing portions, the components being shown in partially assembled position.

The next step in the formation of the present slipper consists in preparing the quarter 42 for incorporation in the slipper. The quarter 42, as best shown in Fig. 6, is of premolded construction of the type which is processed by counter molding machines in various sizes adapted for use in slippers of varying sizes and consists of an outer leather covering 44, a stiff leather or fibrous counter 46 and an inner lining 48 of any suitable material, such as cloth or leather. The premolded quarter is provided with an inwardly turned flange or lip (not shown) to which the tuck 50 is secured. In order to retain the quarter 42 in its desired shape prior to its incorporation in the slipper and to facilitate attachment of the quarter to the outsole, a relatively stiff fibrous tuck 50, shaped to substantially conform to the bottom surface of the wearer's heel, is inserted into and secured by staples 52 to the upper surface of the flange or lip of the quarter 42. During this operation the quarter 42 may be somewhat shaped, if desired, by compressing its sides together or expanding the same prior to securing the tuck 50 in position within the quarter 42 as heretofore described. In practice the attachment of tuck 50 in operative position within the quarter may be performed at any stage during the present method of making the slipper. Preferably, however, during production a backlog of completely formed quarters is maintained in order to prevent a delay in the succeeding steps in the manufacture of the slipper.

The next step in the formation of the present slipper consists in the assembly of the quarter 42 with relation to the vamp 18, shank 28 and outsole 10. The forward end of the quarter 42 is inserted under the wing portions 22, 24 and attached shank 28 and substantially aligned with the guide mark 12. When held in this position the opposing end of the quarter 42 will be in substantial alignment with the rearmost end of the guide mark 16. The shank 28 is then fitted within the quarter 42 and firmly pressed upon the surface of the tuck 50 with its heel end 32 disposed against the back of the quarter so as to completely cover the tuck and form a substantially smooth surface therein. The rear portion of the shank 28 is then tacked to the outsole 10. In this manner the quarter 42 is securely tacked to the outsole 10 and the quarter, shank and vamp of the slipper firmly secured in operative relation to one another. A suitable heel 43 is then secured to the heel portion of the outsole by nailing the same through the outsole 10, tuck 50 and shank piece 28, the nails 45 being clinched through the shank 28. In this manner the components of the slipper are firmly secured together.

It will be observed from the description thus far that the wing portions 22, 24 are firmly interlocked between the forward end of the quarter 42 and the shank 28. The shank 28 forms a suspension bridge across the shank portion of the slipper between the quarter 42 and the toe portion thereof such that the weight of the person wearing the slipper serves to further compress the shank 28, wing portions 22, 24 and quarter 42 against the outsole 10, thus substantially strengthening the connection therebetween and preventing the slipper from breaking at this point during use.

It will be observed that in accordance with the present invention the shank 28 is of sufficient width to substantially overlie the wing portions 22, 24 and the stitching 26, as shown, to permit the shank 28 and wing portions 22, 24 to be securely fastened together as heretofore described.

In practice upon the completion of the foregoing steps in the present method, the slipper may then be pressed and leveled, relasted and then finished in accordance with the usual method practiced in the slipper manufacturing industry. While it is preferred, in accordance with the present invention, to manufacture the present slipper substantially entirely of leather, as heretofore described, the slippers may be manufactured in part from other suitable materials, such as a suitable fabric or the like.

From the foregoing description it will be apparent that hand-turned slippers manufactured in accordance with the present novel and improved method embody substantially all of the desired qualities of lightness, flexibility, comfort and durability of slippers manufactured in accordance with conventional hand-turned methods. The additional advantages include a smooth, wrinkle-free lining and perfect fitting counter in a quality premolded quarter, the manner in which the wings, shank piece and quarter are attached overcoming difficulties which have heretofore been experienced with slippers in which the component parts are attached by cementing or nailing to the outsole. The present slipper may be manufactured substantially more economically than conventional hand-turned slippers.

This application is a division of my copending application, Serial No. 559,677, filed January 17, 1956 which has matured into Patent No. 2,845,724, granted August 5, 1958.

Having thus described the invention, what is claimed is:

1. In the method of making turned slippers, the steps comprising providing a vamp having rearwardly extended wing portions, an outsole and a separate quarter, lasting and stitching the vamp to the outsole inside out and cutting the stitches back to free the wings from the outsole, then removing the last and turning the vamp right side out, assembling a shank piece with its forward portion within the vamp, securing the forward portion of the shank piece to and upon the upper surfaces of said free wings, inserting the forward end of the quarter under the wing portions and under the attached shank piece to dispose the rear portion of the shank piece within the quarter, and then securing the rear portion of the shank piece to the outsole leaving the forward portions of the shank piece and the quarter, respectively, unattached to the sole.

2. In a method of making hand-turned slippers embodying an outsole, a vamp and a premolded quarter comprising the steps of lasting and stitching a vamp to an outsole inside out, then removing the last and turning the vamp right side out, then cutting the stitches back to free the rear portions of the vamp from the outsole, securing a relatively wide shank piece to the upper surface of the rear portions of the vamp, and then inserting the leading portion of a premolded quarter under said rear portions of the vamp and the attached shank piece and securing the rear portions of the shank piece and quarter to the outsole.

3. A method of making hand-turned slippers comprising the steps of first marking the upper surface of the outsole with a guide line forward of the shank portion thereof, and with a second guide line adjacent the forward end of the heel portion of said outsole, and with a relatively thick guide line spaced inwardly a short distance from the end of the heel portion of said outsole, lasting the vamp portion to said outsole inside out, stitching the vamp to said outsole, then turning the vamp right side out, cutting the vamp stitches back to the first guide line to form freed wing portions and securing a relatively wide shank to said wing portions so that the marginal edges of said shank overlie the wing portions and stitching of the vamp, inserting the forward end of a premolded quarter under said wing portions and the attached shank so that its forward end is in alignment with the first guide line, and the rearmost end of said quarter in alignment with the inner end of the relatively thick guide mark, and then securing the heel portion of the shank, quarter and outsole together leaving the wing portions and forward portion of the shank free of said outsole.

4. In a method of making a hand-turned slipper which comprises an outsole, a vamp provided with wing portions and premolded quarter, the steps of providing a mark at the forward end of the shank of the outsole, a second mark at the forward end of the heel portion of the outsole and a third mark adjacent the rear portion of the heel of said outsole, then lasting the vamp and securing the same to the outsole inside out, the wing portions of the vamp disposed in alignment with the second mark, then removing the last and turning the vamp right side out, then freeing the wing portions of the vamp from the outsole, then placing the rear edge of a relatively wide shank piece in alignment with the third mark such that the forward portion of the shank piece overlies the wing portions of the vamp and the vamp stitches, then mechanically securing the forward portion of said shank piece to said wing portions, then securing a tuck within the premolded quarter and inserting the leading edge of the quarter under said wing portions to dispose the same in alignment with the first mark, then mechanically securing the rear portion of the shank piece within the quarter and to the outsole by tacks extended through the shank piece, quarter and into the outsole leaving the wing portions, the forward portion of the shank piece and the forward portion of the tuck free of the outsole.

References Cited in the file of this patent
UNITED STATES PATENTS

| | | |
|---|---|---|
| 2,064,417 | Del Re | Dec. 15, 1936 |
| 2,208,531 | Wilkinson et al. | July 16, 1940 |
| 2,438,821 | Quinn | Mar. 30, 1948 |